(12) United States Patent
Gou et al.

(10) Patent No.: US 11,870,577 B2
(45) Date of Patent: Jan. 9, 2024

(54) METHOD AND APPARATUS FOR TRANSMITTING UPLINK CONTROL INFORMATION IN A PHYSICAL UPLINK SHARED CHANNEL, AND STORAGE MEDIUM

(71) Applicant: ZTE CORPORATION, Shenzhen (CN)

(72) Inventors: Wei Gou, Shenzhen (CN); Peng Hao, Shenzhen (CN); Zhisong Zuo, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 191 days.

(21) Appl. No.: 17/054,363

(22) PCT Filed: Apr. 26, 2019

(86) PCT No.: PCT/CN2019/084624
§ 371 (c)(1),
(2) Date: Nov. 10, 2020

(87) PCT Pub. No.: WO2019/214466
PCT Pub. Date: Nov. 14, 2019

(65) Prior Publication Data
US 2021/0194628 A1    Jun. 24, 2021

(30) Foreign Application Priority Data

May 11, 2018   (CN) .......................... 201810450605.9

(51) Int. Cl.
*H04L 1/00* (2006.01)
*H04W 72/0446* (2023.01)
(Continued)

(52) U.S. Cl.
CPC .......... *H04L 1/0068* (2013.01); *H04L 1/0004* (2013.01); *H04W 72/0446* (2013.01);
(Continued)

(58) Field of Classification Search
CPC ... H04L 1/0068; H04L 1/0004; H04L 1/0015; H04L 5/0044; H04L 5/0053;
(Continued)

(56) References Cited

U.S. PATENT DOCUMENTS

2013/0016687 A1   1/2013  Yang et al.
2017/0290008 A1  10/2017  Tooher et al.
(Continued)

FOREIGN PATENT DOCUMENTS

CN   102710376 A   10/2012
CN   102934381 A    2/2013
(Continued)

OTHER PUBLICATIONS

Remaining issues for multiplexing UCI on PUSCH, 3GPP TSG RAN WG1 Meeting #92, R1-1802839 Athens, Greece, Feb. 26-Mar. 2, 2018 (Year: 2018).*
(Continued)

*Primary Examiner* — Thinh D Tran
(74) *Attorney, Agent, or Firm* — Bond Schoeneck & King PLLC; George R. McGuire

(57) ABSTRACT

Provided are a transmission method, apparatus and system. The transmission method includes: in response to UCI being configured to be transmitted in a PUSCH, and the PUSCH does not have a UL-SCH, determining to transmit the UCI according to an actual code rate of the UCI and a preset threshold. The preset threshold is determined according to a predetermined code rate and a predetermined value β. In the embodiment of the present disclosure, when the UCI is transmitted based on a given modulation mode, the UCI is
(Continued)

determined to be transmitted according to the actual code rate of the UCI and the preset threshold.

14 Claims, 2 Drawing Sheets

(51) Int. Cl.
  *H04W 72/0453* (2023.01)
  *H04W 72/044* (2023.01)
  *H04W 72/21* (2023.01)
(52) U.S. Cl.
  CPC ... *H04W 72/0453* (2013.01); *H04W 72/0466* (2013.01); *H04W 72/21* (2023.01)
(58) Field of Classification Search
  CPC ......... H04W 72/0413; H04W 72/0446; H04W 72/0453; H04W 72/0466; H04W 72/1284
  See application file for complete search history.

(56) References Cited

U.S. PATENT DOCUMENTS

| | | | |
|---|---|---|---|
| 2018/0006787 A1 | 1/2018 | Chen et al. | |
| 2018/0070369 A1 | 3/2018 | Papasakellariou | |
| 2019/0037586 A1* | 1/2019 | Park | H04L 5/00 |
| 2019/0059013 A1* | 2/2019 | Rahman | H04W 72/10 |
| 2019/0149291 A1* | 5/2019 | Xiong | H04B 7/063 370/329 |
| 2019/0166615 A1* | 5/2019 | Nimbalker | H04L 5/0091 |
| 2020/0404651 A1* | 12/2020 | Takeda | H04W 72/0446 |
| 2021/0058920 A1* | 2/2021 | Lin | H04W 72/21 |
| 2022/0053525 A1* | 2/2022 | Lee | H04B 7/0645 |

FOREIGN PATENT DOCUMENTS

| | | |
|---|---|---|
| JP | 2013531407 A | 8/2013 |
| JP | 2016514916 A | 5/2016 |
| WO | 2012005123 A1 | 9/2013 |

OTHER PUBLICATIONS

Samsung "Corrections on UCI Multiplexing in PUSCH" 3GPP TSG RAN WG1 #92bis, pp. 1-5.
Qualcomm Incorporated "Remaining issues for multiplexing UCI on PUSCH" 3GPP TSG RAN WG1 Meeting #92bis, pp. 1-9.
Translated Japanese Office Action, pp. 1-6.
India Office Action, dated Dec. 16, 2021. pp. 1-6.
Remaining issues for multiplexing UCI on PUSCH, 3GPP TSG RAN WG1 Meeting #92, R1-1802839 Athens, Greece, Feb. 26-Mar. 2, 2018.
Summary of remaining issues for UCI multiplexing on PUSCH, 3GPP TSG RAN WG1 Meeting #92bis, R1-1805554 Sanya, China, Apr. 16-20, 2018.
Partial Supplementary European Search Report, dated Dec. 17, 2021. pp. 1-14.
Translated Chinese Search Report.
Translated Chinese Office Action.
Huawei, Hisilicon "Remaining Issues on UCI Multiplexing" 3GPP TSG RAN WGI Meeting #92, R1-1801341, Feb. 17, 2018 (Feb. 17, 2018), section 2.3.
International Search Report Form PCT/ISA/210, and Written Opinion Form PCT/ISA/237, International Application No. PCT/CN2019/084624 pp. 1-6 International Filing Date Apr. 26, 2019, dated Jul. 8, 2019.
Translated JP Office Action—JP Application 2021-512985, dated Jul. 25, 2022. pp. 1-5.

* cited by examiner

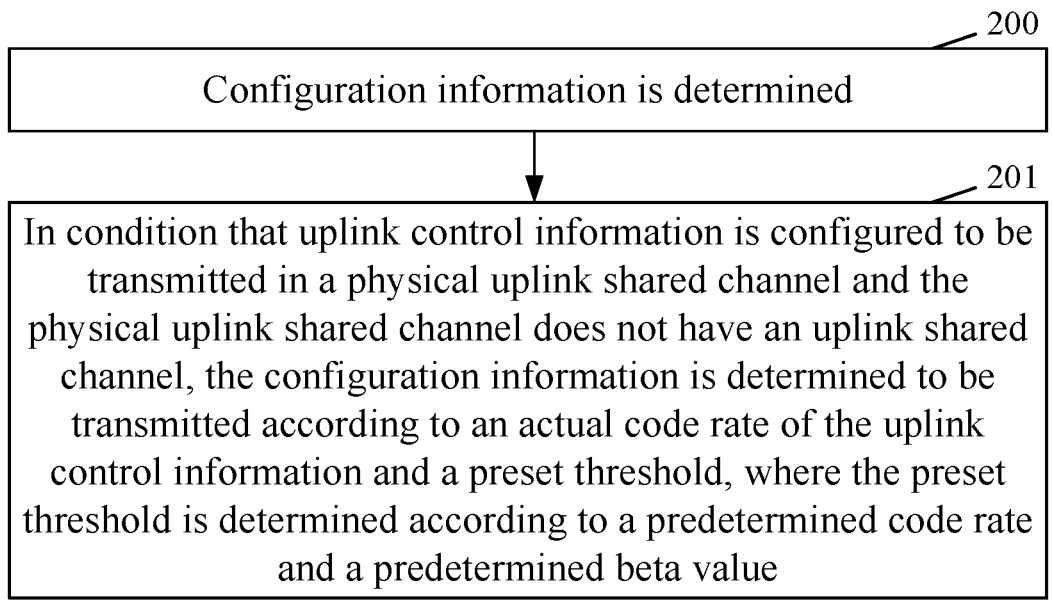

US 11,870,577 B2

METHOD AND APPARATUS FOR TRANSMITTING UPLINK CONTROL INFORMATION IN A PHYSICAL UPLINK SHARED CHANNEL, AND STORAGE MEDIUM

CROSS-REFERENCES TO RELATED APPLICATIONS

This is a National Stage Application, filed under 35 U.S.C. 371, of International Patent Application No. PCT/CN2019/084624, filed on Apr. 26, 2019, which is based on and claims priority to Chinese patent application No. 201810450605.9 filed on May 11, 2018, disclosure of which is incorporated herein by reference in its entirety.

TECHNICAL FIELD

Embodiments of the present disclosure relate to the field of communications and, in particular, to a transmission method, apparatus and system.

BACKGROUND

In a new radio (NR) mobile communication system, for a user equipment (UE), uplink control information (UCI) can be transmitted through a physical uplink shared channel (PUSCH), and the UE is allowed to have no actual uplink data, that is, the PUSCH only includes the UCI and no uplink shared channel (UL-SCH) is included in the PUSCH. In this case, PUSCH resources allocated by a base station to the UE are actually used to transmit the UCI.

Currently, in the NR, the UCI is allowed to be transmitted by using all modulation modes and a code rate of the PUSCH. For example, the UCI is allowed to be transmitted by using a higher-order modulation mode (such as a quadrature amplitude modulation (QAM) 256) to improve a transmission efficiency of data. However, in order to ensure reliability of UCI transmission, the UCI is generally transmitted by using a low-order modulation mode (such as quadrature phase shift key (QPSK)). In this way, when the UE is configured by the base station to transmit the UCI in the PUSCH, if the higher-order modulation mode and more time-frequency resources are configured to satisfy a requirement for a low bit rate of the UCI transmission, especially in a case of poor channel quality, when a bit number of the transmitted UCI is relatively small, allocating a lot of time-frequency resources to the UE and the higher-order modulation mode undoubtedly reduces the transmission efficiency, increases complexity of the UE and wastes the time-frequency resources.

Furthermore, since in the current NR system, PUSCH time division multiplexing transmission is supported in one time slot, when the UCI is transmitted in the PUSCH, a new problem is faced, that is, when the UCI is determined to be transmitted in one time slot, which PUSCH does the UE transmit the UCI in when there are multiple PUSCHs in the one time slot?

SUMMARY

Embodiments of the present disclosure provide a transmission method and apparatus, and a system, which can improve a transmission efficiency and reduce implementation complexity.

An embodiment of the present disclosure provides a transmission method and includes steps described below.

When uplink control information is configured to be transmitted in a physical uplink shared channel and the physical uplink shared channel does not have an uplink shared channel, transmission of the uplink control information is determined according to an actual code rate of the uplink control information and a preset threshold.

The preset threshold is determined according to a predetermined code rate and a predetermined beta value.

In the embodiment of the present disclosure, the actual code rate of the uplink control information is acquired according to at least one of: a type of the uplink control information, a bit number of the uplink control information, a configured code rate, a modulation mode of the uplink control information, resources of the physical uplink shared channel, or a configured beta value.

In the embodiment of the present disclosure, determining to transmit the uplink control information according to the actual code rate of the uplink control information and the preset threshold includes at least one of: in response to the actual code rate being greater than or equal to the preset threshold, transmitting the uplink control information in the physical uplink shared channel.

In the embodiment of the present disclosure, determining the preset threshold according to a predetermined code rate and a predetermined beta value includes: the preset threshold being $$Qm\frac{r}{\beta} \text{ or } Qm\frac{r}{c\beta}.$$

Where r is the predetermined code rate, $\beta$ is the predetermined beta value, c is an adjustment factor, and Qm is a modulation order corresponding to the modulation mode.

In the embodiment of the present disclosure: the predetermined code rate is a minimum value of a code rate corresponding to a physical uplink control channel, and the predetermined beta value is a maximum value of a beta value corresponding to the uplink control information.

Alternatively, the predetermined code rate is the minimum value of the code rate corresponding to the physical uplink control channel, and the predetermined beta value is the configured beta value.

Alternatively, the predetermined code rate is the configured code rate, and the predetermined beta value is the maximum value of the beta value corresponding to the uplink control information.

In the embodiment of the present disclosure, at least one of characteristics described below is included.

When the configured code rate has a code rate of a previous level and the configured beta value has a beta value of a next level, the predetermined code rate is the code rate of the previous level of the configured code rate, and the predetermined beta value is the beta value of the next level of the configured beta value.

When the configured code rate has the code rate of the previous level and the configured beta value does not have the beta value of the next level, the predetermined code rate is the code rate of the previous level of the configured code rate, and the predetermined beta value is the configured beta value.

When the configured code rate does not have the code rate of the previous level and the configured beta value has the beta value of the next level, the predetermined code rate is the configured code rate, and the predetermined beta value is the beta value of the next level of the configured beta value.

When the configured code rate does not have the code rate of the previous level and the configured beta value does not have the beta value of the next level, the predetermined code rate is the configured code rate, and the predetermined beta value is the configured beta value.

In the embodiment of the present disclosure, at least one of characteristics described below is included.

When the configured code rate has a code rate of a previous level, the predetermined code rate is the code rate of the previous level of the configured code rate, and the predetermined beta value is the configured beta value.

When the configured code rate does not have the code rate of the previous level, the predetermined code rate is the configured code rate, and the predetermined beta value is the configured beta value.

In the embodiment of the present disclosure, at least one of characteristics described below is included.

When the configured beta value has a beta value of a next level, the predetermined code rate is the configured code rate, and the predetermined beta value is the beta value of the next level of the configured beta value.

When the configured beta value does not have the beta value of the next level, the predetermined code rate is the configured code rate, and the predetermined beta value is the configured beta value.

In the embodiment of the present disclosure, determining the preset threshold according to a predetermined code rate and a predetermined beta value includes:

the preset threshold being $$\frac{r}{\beta} \text{ or } \frac{r}{c\beta};$$

Where r is the predetermined code rate and the predetermined code rate is a minimum value of a code rate corresponding to a modulation mode configured in a modulation coding table, β is the predetermined beta value, and c is an adjustment factor.

In the embodiment of the present disclosure, the predetermined beta value is selected from a beta value configuration table corresponding to the uplink control information.

An embodiment of the present disclosure provides a transmission method and includes steps described below.

Configuration information is determined.

When uplink control information is configured to be transmitted in a physical uplink shared channel, and the physical uplink shared channel does not have an uplink shared channel, transmission of the configuration information is determined according to an actual code rate of the uplink control information and a preset threshold.

The preset threshold is determined according to a predetermined code rate and a predetermined beta value.

An embodiment of the present disclosure provides a transmission apparatus and includes a first determination module.

The first determination module is configured to: when uplink control information is configured to be transmitted in a physical uplink shared channel, and the physical uplink shared channel does not have an uplink shared channel, determine to transmit the uplink control information according to an actual code rate of the uplink control information and a preset threshold.

The preset threshold is determined according to a predetermined code rate and a predetermined beta value.

An embodiment of the present disclosure provides a transmission apparatus and includes a second determination module and a third determination module.

The second determination module is configured to determine configuration information.

The third determination module is configured to: when uplink control information is configured to be transmitted in a physical uplink shared channel, and the physical uplink shared channel does not have an uplink shared channel, determine to transmit the configuration information according to an actual code rate of the uplink control information and a preset threshold.

The preset threshold is determined according to a predetermined code rate and a predetermined beta value.

An embodiment of the present disclosure provides a transmission apparatus, the transmission apparatus includes a processor and a computer-readable storage medium configured to store instructions, and when executed by the processor, the instructions implement any one of the above-mentioned transmission methods.

An embodiment of the present disclosure provides a computer-readable storage medium. The computer-readable storage medium stores computer programs, and when executed by a processor, the computer programs implement steps of any one of the above-mentioned transmission methods.

The embodiment of the present disclosure includes a step described below. When the UCI is configured to be transmitted in the PUSCH and the PUSCH does not have a UL-SCH, the UCI is determined to be transmitted according to the actual code rate of the UCI and the preset threshold. The preset threshold is determined according to the predetermined code rate and the predetermined β value. The step is an easy-to-implement process. In the embodiment of the present disclosure, when the UCI is transmitted based on a given modulation mode, the UCI is determined to be transmitted according to the actual code rate of the UCI and the preset threshold, and this limitation will make allocated time-frequency resources relatively reasonable under a condition that the modulation mode is given and the bit number of transmitted UCI is determined, that is, a code rate matched with the modulation mode can be achieved, thus improving the transmission efficiency and reducing the implementation complexity.

In another embodiment, determining the preset threshold according to the predetermined code rate and the predetermined beta value includes a step described below.

The preset threshold is $$Qm\frac{r}{\beta} \text{ or } Qm\frac{r}{c\beta},$$

where r is the predetermined code rate, β is the predetermined beta value, c is the adjustment factor, and Qm is a modulation order corresponding to the modulation mode. In this way, the embodiment of the present disclosure can ensure that for a given modulation mode, data is always transmitted using a best code rate corresponding to the modulation mode, thereby eliminating some inefficient code rates. For example, it is well known that a high-order modulation mode is generally used in a case where a channel quality is very good, and at this time, a corresponding actual transmission code rate is very high, few time-frequency resources are used, and can be correctly decoded by a receiving end, thus achieving an efficient transmission of data. However, when the channel quality is poor and the high-order modulation mode is still used, in order to ensure the reliability of transmission, more time-frequency resources need to be used to achieve a lower actual code rate through continuous repeated coding, such that the data transmitted in the high-order modulation mode can be correctly decoded at the receiving end. Apparently, the latter is an inefficient way and should be banned. Therefore, each modulation mode has its own optimal code rate. That is to say, for a modulation mode, if a code rate is excessively lower than the corresponding optimal code rate, the transmission efficiency will be low. Therefore, by limiting a lower limit of the actual code rate, the above-mentioned excessively being lower than the corresponding optimal code rate of the modulation mode can be avoided, thus improving the transmission efficiency.

Other features and advantages of the embodiments of the present disclosure will be elaborated hereinafter in the description and, moreover, partially become apparent from the description, or will be understood through embodiments of the present disclosure. The object and other advantages of the embodiments of the present disclosure may be implemented and obtained through structures set forth in the description, claims and drawings.

BRIEF DESCRIPTION OF DRAWINGS

The drawings are used to provide a further understanding of solutions of the embodiments of the present disclosure, constitute a part of the specification, explain the embodiments of the present disclosure in conjunction with examples of the embodiments of the present disclosure, and do not limit the solutions of the embodiments of the present disclosure.

FIG. 1 is a flowchart of a transmission method according to an embodiment of the present disclosure;

FIG. 2 is a flowchart of a transmission method according to another embodiment of the present disclosure;

FIG. 3 is a structural diagram of a transmission apparatus according to another embodiment of the present disclosure;

DETAILED DESCRIPTION

Figure 4:
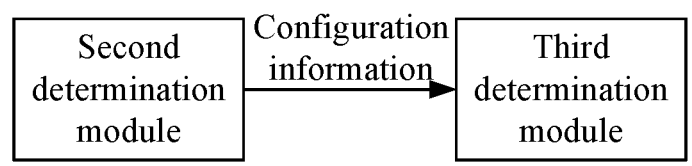
FIG. 4 is a structural diagram of a transmission apparatus according to another embodiment of the present disclosure.

Embodiments of the present disclosure will be described below in detail in conjunction with the drawings. It is to be noted that if not in collision, the embodiments and features therein in the present disclosure may be combined with each other.

The steps illustrated in the flowcharts among the drawings may be performed by a computer system such as a group of computers capable of executing instructions. Moreover, although logical sequences are illustrated in the flowcharts, the illustrated or described steps may be performed in sequences different from those described herein in some cases.

Referring to FIG. 1, an embodiment of the present disclosure provides a transmission method and includes steps described below.

In step 100, in condition that UCI is configured to be transmitted in a PUSCH and the PUSCH does not have a UL-SCH, the UCI is determined to be transmitted according to an actual code rate of the UCI and a preset threshold. The preset threshold is determined according to a predetermined code rate and a predetermined $\beta$ value.

In the embodiment of the present disclosure, when the UCI is transmitted based on a given modulation mode, the UCI is determined to be transmitted according to the actual code rate of the UCI and the preset threshold, and this limitation may lead to a relatively reasonable allocation of time-frequency resources under a condition that the modulation mode is given and a bit number of transmitted UCI is determined, that is, a code rate matched with a modulation mode may be achieved, thus improving a transmission efficiency and reducing implementation complexity.

In the embodiment of the present disclosure, the UCI includes at least one of: hybrid automatic repeat request acknowledgement (HARQ-ACK) information, scheduling request (SR), channel state information (CSI), CSI part 1(CSI-1) or CSI part 2 (CSI-2).

In the embodiment of the present disclosure, the actual code rate is acquired according to at least one of: a type of the UCI, a bit number of the UCI, a configured code rate, a modulation mode of the UCI, resources of the PUSCH, or a configured beta value.

Alternatively, the actual code rate is simplified as a ratio of the configured code rate to the configured beta value.

A specific derivation procedure is described below.

The actual code rate for transmitting the UCI is approximately calculated according to formula (1).

$$\frac{O_{UCI} + L_{UCI}}{Q_m Q_{UCI}} \qquad (1).$$

$O_{UCI}$ is the bit number of the UCI, $L_{UCI}$ is a bit number of a cyclic redundancy check (CRC) of the UCI, $Q_m$ is a modulation order corresponding to the modulation mode, and $Q'_{UCI}$ is a number of modulation symbols of UCI after being bit-encoded.

When the UCI is an ACK, $$Q'_{UCI} = \qquad (2).$$

$$Q'_{ACK} = \min\left\{ \left\lceil \frac{(O_{ACK} + L_{ACK}) \times \beta_0}{SE} \right\rceil, \left\lfloor \alpha \times \sum_{l=l_0}^{N_{symb,all}^{PUSCH}-1} M_{sc}^{UCI}(l) \right\rfloor \right\}$$

$O_{ACK}$ is a bit number of the ACK, $L_{ACK}$ is a bit number of a CRC of the ACK, $Q'_{ACK}$ is a number of modulation symbols of an ACK bit after being encoded, $SE=r_0 Q_m$, $r_0$ is the configured code rate (may be a code rate of the PUSCH or a code rate of a physical uplink control channel (PUCCH)), $\beta_0$ is the configured beta value, $N_{symb,all}^{PUSCH}$ a number of symbols of the UCI carried in the PUSCH, and $M_{sc}^{UCI}(l)$ is a number of resource units in a symbol l of an orthogonal frequency division multiplexing (OFDM) technology of the UCI carried in the PUSCH.

When an equation before the curly brace is selected as an approximate value of $Q_{AC}$(according to the probability, the actual code rate of the ACK obtained by substituting formula (2) into formula (1) is $$\frac{r_0}{\beta_0}.$$

When the UCI is the CSI-1, $$Q'_{UCI} = \qquad (3).$$

$$Q'_{CSI-1} = \min\left\{\left\lceil\frac{(O_{CSI-1} + L_{CSI-1}) \cdot \beta_0}{SE}\right\rceil, \sum_{l=0}^{N^{PUSCH}_{symb,all}-1} M^{UCI}_{sc}(l) - Q'_{ACK}\right\}$$

$O_{CSI-1}$ is a bit number of the CSI-1, $L_{CSI-1}$ is a bit number of a CRC of the CSI-1, and $Q'_{CSI-1}$ is a number of modulation symbols of a CSI-1 bit after being encoded.

When an equation before the curly brace is selected as an approximate value of $Q'_{CSI-1}$ according to the probability, the actual code rate of the CSI-1 obtained by substituting formula (3) into formula (1) is $$\frac{r_0}{\beta_0}.$$

When the UCI is the CSI-2, $$Q'_{UCI}=Q'_{CSI-2}=\Sigma_{l=0}^{N_{symb,all}^{PUSCH}-1} M_{SC}^{UCI}(l)-Q'_{ACK}-Q'_{CSI-1} \qquad (4).$$

$Q'_{CSI-2}$ is a number of modulation symbols of a CSI-2 bit after being encoded.

The above-mentioned derivation is performed by using the CSI-1, but a conclusion of the derivation is used as uplink control information of other types.

In the embodiment of the present disclosure, determining to transmit the uplink control information according to the actual code rate of the uplink control information and the preset threshold includes a step described below.

When the actual code rate is greater than or equal to the preset threshold, the uplink control information is transmitted in the physical uplink shared channel.

In another embodiment of the present disclosure, the method further includes that when the actual code rate is less than the preset threshold, the uplink control information is not transmitted in the physical uplink shared channel.

The UCI not being transmitted in the PUSCH may refer to that the UCI is transmitted in a channel different from the PUSCH, or the UCI is not transmitted.

In the embodiment of the present disclosure, determining the preset threshold according to the predetermined code rate and the predetermined beta value includes a feature described below.

The preset threshold is $$Qm\frac{r}{\beta} \text{ or } Qm\frac{r}{c\beta}.$$

r is the predetermined code rate, β is the predetermined beta value, c is an adjustment factor, and Qm is a modulation order corresponding to the modulation mode (as shown in table 3).

Alternatively, the preset threshold is $$\frac{r}{\beta} \text{ or } \frac{r}{c\beta}.$$

r is the predetermined code rate and the predetermined code rate is a minimum value of a code rate corresponding to a modulation mode configured in a modulation coding table, β is the predetermined beta value, and c is the adjustment factor. Where c is an integer greater than 0.

In this way, the embodiment of the present disclosure can ensure that for a given modulation mode, data is always transmitted using a best code rate corresponding to the modulation mode, thereby eliminating some inefficient code rates. For example, it is well known that a high-order modulation mode is generally used in a case where a channel quality is very good, a corresponding actual transmission code rate is very high at this time, few time-frequency resources are used, and can be correctly decoded by a receiving end, thus achieving an efficient transmission of data. However, when the channel quality is poor and the high-order modulation mode is still used, in order to ensure the reliability of transmission, more time-frequency resources need to be used to achieve a lower actual code rate through continuous repeated coding, such that the data transmitted in the high-order modulation mode can be correctly decoded at the receiving end. Apparently, the latter is an inefficient way and should be banned. Therefore, each modulation mode has its own optimal code rate. That is to say, for a modulation mode, if a code rate is excessively lower than the corresponding optimal code rate, the transmission efficiency will be low. Therefore, by limiting a lower limit of the actual code rate, the above-mentioned excessively being lower than the corresponding optimal code rate of the modulation mode can be avoided, thus improving the transmission efficiency.

In the embodiment of the present disclosure, the predetermined code rate and the predetermined beta value may be selected from any of the following items (1) to (8).

(1). The predetermined code rate is a minimum value of a code rate corresponding to the PUCCH (as shown in Table 1-1), and the predetermined beta value is a maximum value of a beta value corresponding to the UCI (as shown in Table 2).

When the UCI is transmitted in the PUSCH, a code rate of the UCI allowed to be used includes any one of rates shown in Table 1-1 to Table 1-4. Table 1-1 is selected from Table 9.2. 5.2-1 of 3GPP TS 38.213 V15.1. 0 (2018-03), Table 1-2 is selected from Table 6.1. 4.1-1 of 3GPP TS 38.214, Table 1-3 is selected from Table 5.1. 3.1-1 of 3GPP TS 38.214, and Table 1-4 is selected from Table 5.1. 3.1-2 of 3GPP TS 38.214.

Section 6.1.4.1 of 3GPP TS 38.214 gives a code rate table used by the PUSCH (when the UCI is transmitted in the PUSCH, the UCI uses the code rate table of the PUSCH). It is to be noted that Tables 5.1.3.1-1 and 5.1.3.1-2 are quoted in section 6.1.4.1, and different code rate tables are used in different cases.

In the embodiment of the present disclosure, Table 9.2.5.2-1 from 3GPP TS 38.213 V15.1. 0 (2018-03) is also considered to be a code rate allowed to be used by the UCI.

Table 1-1 is described as an example. For other tables, a same principle is used in the embodiment of the present disclosure and will not be repeated. Table 1-1 defines code rates corresponding to different formats of the PUCCH (the code rates are reference code rates). That is to say, a reliability requirement is considered to be satisfied only when PUCCH transmission is basically greater than or equal to a code rate described below Of course, different code rates correspond to different channel qualities, a bit number carried in the PUCCH, or the like. However, in general, when a service corresponding to the PUCCH has a relatively high reliability requirement or the channel quality is poor, a lower code rate will be used; and conversely, a higher code rate will be used.

TABLE 1-1

| An index value of an F2 format, F3 format, or F4 format of a PUCCH | Code rate r |
|---|---|
| 0 | 0.08 |
| 1 | 0.15 |
| 2 | 0.25 |
| 3 | 0.35 |
| 4 | 0.45 |
| 5 | 0.60 |
| 6 | 0.80 |
| 7 | reserved |

TABLE 1-2

| MCS index | Value of Qm corresponding to a modulation mode | Code rate r × 1024 | Spectrum efficiency |
|---|---|---|---|
| 0 | q | 240/q | 0.2344 |
| 1 | q | 314/q | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 466 | 2.7305 |
| 18 | 6 | 517 | 3.0293 |
| 19 | 6 | 567 | 3.3223 |
| 20 | 6 | 616 | 3.6094 |
| 21 | 6 | 666 | 3.9023 |
| 22 | 6 | 719 | 4.2129 |
| 23 | 6 | 772 | 4.5234 |
| 24 | 6 | 822 | 4.8164 |
| 25 | 6 | 873 | 5.1152 |
| 26 | 6 | 910 | 5.3320 |
| 27 | 6 | 948 | 5.5547 |
| 28 | q | | reserved |
| 29 | 2 | | reserved |
| 30 | 4 | | reserved |
| 31 | 6 | | reserved |

In Table 1-2, when indexes of a modulation and coding scheme (MCS) is 0, 1 and 28, if the UE supports pi/2 binary phase shift keying (BPSK) modulation, q=1, and for other modulations, q=2.

TABLE 1-3

| MCS index | Value of Qm corresponding to a modulation mode | Code rate r × 1024 | Spectrum efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | | reserved |
| 30 | 4 | | reserved |
| 31 | 6 | | reserved |

TABLE 1-4

| Modulation mode index | value of Qm corresponding to the modulation mode | Code rate r × 1024 | Spectrum efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | | reserved |
| 29 | 4 | | reserved |
| 30 | 6 | | reserved |
| 31 | 8 | | reserved |

When the UCI is the CSI, and the CSI is transmitted in the PUSCH, β is one of parameters used to determine a number of coded modulation symbols of the CSI. Values of β can be seen from Table 2. Table 2 is selected from Table 9.3-2 of 3GPP TS 38.213 V15.1. 0 (2018-03).

TABLE 2

| $I_{offset,0}^{CSI-1}$, $I_{offset,1}^{CSI-2}$, $I_{offset,0}^{CSI-2}$ or $I_{offset,1}^{CSI-2}$ (index value) | $\beta_{offset}^{CSI-1}$ or $\beta_{offset}^{CSI-2}$ |
|---|---|
| 0 | 1.125 |
| 1 | 1.250 |
| 2 | 1.375 |
| 3 | 1.625 |
| 4 | 1.750 |
| 5 | 2.000 |
| 6 | 2.250 |
| 7 | 2.500 |
| 8 | 2.875 |
| 9 | 3.125 |
| 10 | 3.500 |
| 11 | 4.000 |
| 12 | 5.000 |
| 13 | 6.250 |
| 14 | 8.000 |
| 15 | 10.000 |
| 16 | 12.625 |
| 17 | 15.875 |
| 18 | 20.000 |
| 19 | Reserved |
| 20 | Reserved |
| 21 | Reserved |
| 22 | Reserved |
| 23 | Reserved |
| 24 | Reserved |
| 25 | Reserved |
| 26 | Reserved |
| 27 | Reserved |
| 28 | Reserved |
| 29 | Reserved |
| 30 | Reserved |
| 31 | Reserved |

For example, when the modulation mode is the BPSK, the preset threshold is $$T_m = \frac{r_{min}}{\beta_{max}},$$

where $r_{min}$ is a minimum value in Table 1, and $\beta_{max}$ is a maximum value in Table 2.

In this way, when the UCI is transmitted in the PUSCH and the PUSCH does not have the UL-SCH, if the BPSK modulation mode is configured, the base station should configure that the actual code rate for transmitting the UCI by the UE to be not less than $T_m$. That is, when the modulation mode is the BPSK, the UE does not expect the actual code rate for transmitting the UCI to be less than $T_m$; or when the UE discovers that the actual code rate for transmitting the UCI is less than $T_m$, the UE considers this to be an error and does not process it, that is, the UCI will not be transmitted. That is to say, when the modulation mode is the BPSK, the UE transmits the UCI only when the actual code rate for transmitting the UCI is not less than $T_m$.

For other modulation modes (the BPSK may also be included), correspondingly, $$T_m = Q_m \frac{r_{min}}{\beta_{max}},$$

and values of $Q_m$ are shown in Table 3.

(2) The predetermined code rate is the minimum value of the code rate corresponding to the PUCCH, and the predetermined beta value is the configured beta value.

For example, when the modulation mode is the BPSK, the preset threshold $$T_m = \frac{r_{min}}{\beta},$$

where $r_{min}$ is a minimum value in Table 1, and $\beta$ is configured by the base station for the UE to transmit the UCI this time and is selected from values of $\beta$ in Table 2.

The base station configures the UE with a modulation mode for transmitting the UCI in the PUSCH (the UE does not have the UL-SCH) and a corresponding value of $\beta$. At this time, the UE uses the configured value $\beta$ for calculation.

In this way, when the UCI is transmitted in the PUSCH and the PUSCH does not have the UL-SCH, if the BPSK modulation mode is configured, the base station should configure that the actual code rate for transmitting the UCI by the UE to be not less than $T_m$. That is, when the modulation mode is the BPSK, the UE does not expect the actual code rate for transmitting the UCI to be less than $T_m$; or when the UE discovers that the actual code rate for transmitting the UCI is less than $T_m$, the UE considers this to be an error and does not process it, that is, the UCI will not be transmitted. That is to say, when the modulation mode is the BPSK, the UE transmits the UCI only when the actual code rate for transmitting the UCI is not less than $T_m$.

For other modulation modes (the BPSK may also be included), correspondingly, $$T_m = Q_m \frac{r_{min}}{\beta},$$

and values of $Q_m$ are shown in Table 3.

(3) The predetermined code rate is the configured code rate, and the predetermined beta value is the maximum value of the beta value corresponding to the UCI.

For example, when the modulation mode is the BPSK, the preset threshold $$T_m = \frac{r}{\beta_{max}},$$

where $r$ is configured by the base station for the UE to transmit the UCI this time and is selected from values of $r$ in Table 1, and $\beta$max is a maximum value in Table 2.

The base station configures the UE with the modulation mode for transmitting the UCI in the PUSCH (UE does not have the UL-SCH) and a corresponding value of $r$. At this time, the UE uses the configured value $r$ for calculation.

In this way, when the UCI is transmitted in the PUSCH and the PUSCH does not have the UL-SCH, if the BPSK modulation mode is configured, the base station should configure that the actual code rate for transmitting the UCI by the UE to be not less than $T_m$, that is, when the modulation mode is the BPSK, the UE does not expect the actual code rate for transmitting the UCI to be less than $T_m$; or when the UE discovers that the actual code rate for transmitting the UCI is less than Tm, the UE considers this to be an error and does not process it, that is, the UCI will not be transmitted. That is to say, when the modulation mode is the BPSK, the UE transmits the UCI only when the actual code rate for transmitting the UCI is not less than $T_m$.

For other modulation modes (the BPSK may also be included), correspondingly, $$T_m = Q_m \frac{r}{\beta_{max}},$$

and values of $Q_m$ are shown in Table 3.

(4) The predetermined code rate is a code rate of a previous level of the configured code rate, that is, a code rate corresponding to a maximum index value smaller than an index value corresponding to the configured code rate; and the predetermined beta value is a beta value of a next level of the configured beta value, that is, a beta value corresponding to a minimum index value greater than an index value corresponding to the configured beta value.

For example, the base station configures that r is 0.35 (referring to Table 1) and beta is 1.625 (referring to Table 2), and when $T_m$ is calculated, $r_{min}$ is replaced by r=0.25 of the previous level of 0.35 (that is, the code rate corresponding to the maximum index value smaller than the index value corresponding to 0.35); and $\beta_{max}$ is replaced by $\beta$=1.750 of the next level of 1.625.

(5) The predetermined code rate is the code rate of the previous level of the configured code rate, that is, the code rate corresponding to the maximum index value smaller than the index value corresponding to the configured code rate; and the predetermined beta value is the configured beta value.

(6) The predetermined code rate is the configured code rate, and the predetermined beta value is the beta value of the next level of the configured beta value, that is, the beta value corresponding to the minimum index value greater than the index value corresponding to the configured beta value.

(7) The predetermined code rate is the configured code rate, and the predetermined beta value is the configured beta value.

For example, in the value of (1), for the configured modulation mode, $$T_m = Q_m \frac{r_{min}}{\beta_{max}}$$

(the value of $Q_m$ can be seen from Table 3); and now according to values of (4)~(7), for the configured modulation mode, $$T_m = Q_m \frac{r_{new}}{\beta_{new}},$$

(the value of $Q_m$ can be seen from Table 3), where $r_{new}$ is a value of a previous level of the configured r; and $\beta_{new}$ is a beta value of a next level of the configured $\beta$. If the configured code rate does not have a corresponding level upward, the configured r is used, such as values of (6) and (7); and if the value of the configured $\beta$ does not have a corresponding level downward, the the value of the configured $\beta$ is used, such as values of (5) and (7).

That is to say, at least one of features described below is included.

When the configured code rate has the code rate of the previous level and the configured beta value has the beta value of the next level, the predetermined code rate is the code rate of the previous level of the configured code rate, and the predetermined beta value is the beta value of the next level of the configured beta value.

When the configured code rate has the code rate of the previous level and the configured beta value does not have the beta value of the next level, the predetermined code rate is the code rate of the previous level of the configured code rate, and the predetermined beta value is the configured beta value.

When the configured code rate does not have the code rate of the previous level and the configured beta value has the beta value of the next level, the predetermined code rate is the configured code rate, and the predetermined beta value is the beta value of the next level of the configured beta value.

When the configured code rate does not have the code rate of the previous level and the configured beta value does not have the beta value of the next level, the predetermined code rate is the configured code rate, and the predetermined beta value is the configured beta value.

For another example, in the value of (2), for the configured modulation mode, $$T_m = Q_m \frac{r_{min}}{\beta_{max}}$$

(the value of $Q_m$ can be seen from Table 3); and now according to values of (4) to (7), for the configured modulation mode, $$T_m = Q_m \frac{r_{new}}{\beta},$$

(the value of $Q_m$ can be seen from Table 3), where $r_{new}$ is the value of the previous level of the configured r. If the configured code rate does not have a corresponding level upward, the configured r is used, such as the value of (7).

That is to say, in the embodiment of the present disclosure, at least one of features described below is included.

When the configured code rate has the code rate of the previous level, the predetermined code rate is the code rate of the previous level of the configured code rate, and the predetermined beta value is the configured beta value.

When the configured code rate does not have the code rate of the previous level, the predetermined code rate is the configured code rate, and the predetermined beta value is the configured beta value.

For another example, in the value of (3), for the configured modulation mode, $$T_m = Q_m \frac{r_{min}}{\beta_{max}}$$

(the value of $Q_m$ can be seen from Table 3); and now according to values of (4) to (7), for the configured modulation mode, $$T_m = Q_m \frac{r}{\beta_{new}},$$

(the value of $Q_m$ can be seen from Table 3), where $\beta_{new}$ is the beta value of the next level of the configured $\beta$. If the value of the configured $\beta$ does not have a corresponding level downward, the value of the configured $\beta$ is used, such as the value of (7).

That is to say, in the embodiment of the present disclosure, at least one of features described below is included.

When the configured beta value has the beta value of the next level, the predetermined code rate is the configured code rate, and the predetermined beta value is the beta value of the next level of the configured beta value.

When the configured beta value does not have the beta value of the next level, the predetermined code rate is the configured code rate, and the predetermined beta value is the configured beta value.

(8) When the UCI uses the code rate table of the PUSCH, for example, when any one of Tables 1-2, 1-3, and 1-4 is used, the following mode for determining the preset threshold $T_m$ is further included.

For a given modulation mode (that is, the value of $Q_m$ is given, which is a modulation mode of the PUSCH configured by the base station and used for transmitting the UCI), correspondingly, $$T_m = \frac{r}{\beta}.$$

r is a minimum value of a code rate corresponding to the modulation mode configured in the modulation coding table, for example, a minimum value of the code rate corresponding to the modulation mode configured in Table 1-2, Table 1-3, or Table 1-4.

β may be configured as any one of the following values:
(1) the configured beta value;
(2) a maximum value of β corresponding to the UCI (the maximum value shown in Table 2); or
(3) the beta value of the next level of the configured beta value, that is, the beta value corresponding to the minimum index value greater than the index value corresponding to the configured beta value is the beta value of the next level of the configured beta value.

Specifically, the value of β can be directly configured as the configured beta value; or directly configured as the maximum value of the βcorresponding to the UCI; or when the configured beta value has the beta value of the next level, the beta value of the next level of the configured beta value is taken, and when the configured beta value does not have a downward level, the configured beta value is taken.

For example, when Table 1-4 is used for UCI transmission in the PUSCH (or Table 1-4 is used for PUSCH transmission), if a configured modulation mode is 16 QAM, that is, Q=4, at this time, r in $$T_m = \frac{r}{\beta}$$

is 378/1024 (that is, a code rate corresponding to 16 QAM in Table 1-4 is {378/1024, 434/1024, 490/1024, 553/1024, 616/1024, 658/1024}, where 378/1024 is the smallest and is selected, that is, the code rate r). In this way, when the UCI (one or more of the HARQ-ACK, SR, CSI-1 and CSI-2) is transmitted in the PUSCH, if the PUSCH does not have the UL-SCH (that is, the PUSCH does not have uplink data of the UE) and it is assumed that the configured modulation mode is 16 QAM, when the actual code rate for transmitting the UCI is less than 378/1024/β (here, it is assumed that the configured β is adopted) after calculation, the UE considers this to be an erroneous configuration (the UCI is not transmitted). That is to say, optimally, the base station forbids the configuration of such related parameters, which result in the actual code rate of the UCI being less than 378/1024/β, when the modulation mode is 16 QAM. When the actual code rate for transmitting the UCI is greater than or equal to 378/1024/β after the calculation, the UE transmits the UCI according to configured relevant information.

This method can be summarized below. If the UCI is configured to be transmitted in the PUSCH and the PUSCH does not have the UL-SCH, when parameters such as the modulation mode and the code rate are configured for transmitting the UCI, the actual code rate for transmitting the UCI should be greater than or equal to $T_m$; and if the actual code rate for transmitting the UCI is less than $T_m$, which will lead to inefficient transmission, the UE does not expect this configuration, considers this as an erroneous configuration, and does not transmit the UCI. Here, $T_m$ is defined as $$T_m = \frac{r}{\beta},$$

where r is the minimum value of the code rate corresponding to the modulation mode configured in the modulation coding table, for example, the minimum value of the code rate corresponding to the modulation mode configured in Table 1-2, Table 1-3, or Table 1-4.

β may be configured as any one of the following values:
(1) the configured beta value;
(2) the maximum value of β corresponding to the UCI (the maximum value shown in Table 2);
(3) the beta value of the next level of the configured beta value, that is, the beta value corresponding to the minimum index value greater than the index value corresponding to the configured beta value is the beta value of the next level of the configured beta value.

During the transmission of the PUSCH, the base station configures modulation and coding tables for different transmission modes.

The above-mentioned mode can be applied to different types of uplink control information, for example, the uplink control information is one of or a combination of multiple of the HARQ-ACK, SR, CSI-1 and CSI-2. If a corresponding table needs to be used for the r or the beta value in the mode, that is, each type of uplink control information uses its own corresponding table. For example, when the uplink control information is the HARQ-ACK, correspondingly, a beta value configuration table of the HARQ-ACK is used; when the uplink control information is the CSI-1, correspondingly, a beta value configuration table of the CSI-1 is used; and when the uplink control information is the CSI-2, correspondingly, a beta value configuration table of the CSI-2 is used.

That is to say, the above-mentioned predetermined beta values come from a beta value configuration table corresponding to the UCI.

Alternatively, the above-mentioned predetermined beta values are preset constants, such as 20, 25, 30, 35, or 40.

In the embodiment of the present disclosure, the modulation mode of the UCI includes at least one of: π/2-BPSK, quadrature phase shift key (QPSK), 16 QAM, 64 QAM, or 256 QAM.

In the embodiment of the present disclosure, values of $Q_m$ corresponding to different modulation modes are shown in Table 3.

TABLE 3

| Modulation mode | value of $Q_m$ corresponding to the modulation mode |
|---|---|
| π/2-BPSK/BPSK | 1 |
| QPSK | 2 |
| 16QAM | 4 |
| 64QAM | 6 |
| 256QAM | 8 |

Referring to FIG. 2, another embodiment of the present disclosure provides a transmission method and includes steps described below.

In step 200, configuration information is determined.

In the embodiment of the present disclosure, the configuration information includes the modulation mode, the above-mentioned configured code rate, the above-mentioned configured beta value, and resources of the PUSCH.

In step 201, in condition that uplink control information is configured to be transmitted in a physical uplink shared channel, and the physical uplink shared channel does not have an uplink shared channel, the configuration information is determined to be transmitted according to an actual code rate of the uplink control information and a preset threshold. The preset threshold is determined according to a predetermined code rate and a predetermined beta value.

In the embodiment of the present disclosure, determining to transmit the configuration information according to the actual code rate of the uplink control information and the preset threshold includes a step described below.

When the actual code rate is greater than or equal to the preset threshold, the configuration information is transmitted.

In another embodiment of the present disclosure, the method further includes a step described below.

When the actual code rate is less than the preset threshold, the configuration information is not transmitted.

The specific implementation of the above-mentioned steps may refer to the specific implementation of the aforementioned embodiments and will not be repeated herein.

Referring to FIG. 3, another embodiment of the present disclosure provides a transmission apparatus (such as a UE) and includes a first determination module.

The first determination module is configured to: when uplink control information is configured to be transmitted in a physical uplink shared channel, and the physical uplink shared channel does not have an uplink shared channel, determine to transmit the uplink control information according to an actual code rate of the uplink control information and a preset threshold.

The preset threshold is determined according to a predetermined code rate and a predetermined beta value.

In the embodiment of the present disclosure, the first determination module is further configured to calculate the actual code rate of the UCI according to at least one of information described below.

A type of the uplink control information, a bit number of the uplink control information, a configured code rate, a modulation mode of the uplink control information, resources of the physical uplink shared channel, or a configured beta value.

In the embodiment of the present disclosure, the first determination module is specifically configured to determine to transmit the uplink control information according to the actual code rate of the uplink control information and the preset threshold by using at least one of modes described below.

When the actual code rate is greater than or equal to the preset threshold, the uplink control information is transmitted in the physical uplink shared channel.

In the embodiment of the present disclosure, the first determination module is further configured as follows.

When the actual code rate is less than the preset threshold, the first determination module does not transmit the uplink control information in the physical uplink shared channel.

In the embodiment of the present disclosure, the first determination module is specifically configured to determine the preset threshold in a mode described below.

The preset threshold is $$Qm\frac{r}{\beta} \text{ or } Qm\frac{r}{c\beta}.$$

r is the predetermined code rate, β is the predetermined beta value, c is an adjustment factor, and Qm is a modulation order corresponding to the modulation mode.

In the embodiment of the present disclosure, the predetermined code rate is a minimum value of a code rate corresponding to physical uplink control information, and the predetermined beta value is a maximum value of a beta value corresponding to the uplink control information.

Alternatively, the predetermined code rate is the minimum value of the code rate corresponding to the physical uplink control information, and the predetermined beta value is the configured beta value.

Alternatively, the predetermined code rate is the configured code rate, and the predetermined beta value is the maximum value of the beta value corresponding to the uplink control information.

Alternatively, the predetermined code rate is a code rate of a previous level of the configured code rate, and the predetermined beta value is a beta value of a next level of the configured beta value.

Alternatively, the predetermined code rate is the code rate of the previous level of the configured code rate, and the predetermined beta value is the configured beta value.

Alternatively, the predetermined code rate is the configured code rate, and the predetermined beta value is the beta value of the next level of the configured beta value.

Alternatively, the predetermined code rate is the configured code rate, and the predetermined beta value is the configured beta value.

In the embodiment of the present disclosure, the actual code rate is a ratio of the configured code rate to the configured beta value.

In the embodiment of the present disclosure, at least one of features described below is included.

When the configured code rate has the code rate of the previous level and the configured beta value has the beta value of the next level, the predetermined code rate is the code rate of the previous level of the configured code rate, and the predetermined beta value is the beta value of the next level of the configured beta value.

When the configured code rate has the code rate of the previous level and the configured beta value does not have the beta value of the next level, the predetermined code rate is the code rate of the previous level of the configured code rate, and the predetermined beta value is the configured beta value.

When the configured code rate does not have the code rate of the previous level and the configured beta value has the beta value of the next level, the predetermined code rate is the configured code rate, and the predetermined beta value is the beta value of the next level of the configured beta value.

When the configured code rate does not have the code rate of the previous level and the configured beta value does not have the beta value of the next level, the predetermined code rate is the configured code rate, and the predetermined beta value is the configured beta value.

In the embodiment of the present disclosure, at least one of features described below is included.

When the configured code rate has the code rate of the previous level, the predetermined code rate is the code rate of the previous level of the configured code rate, and the predetermined beta value is the configured beta value.

When the configured code rate does not have the code rate of the previous level, the predetermined code rate is the configured code rate, and the predetermined beta value is the configured beta value.

In the embodiment of the present disclosure, at least one of features described below is included.

When the configured beta value has the beta value of the next level, the predetermined code rate is the configured code rate, and the predetermined beta value is the beta value of the next level of the configured beta value.

When the configured beta value does not have the beta value of the next level, the predetermined code rate is the configured code rate, and the predetermined beta value is the configured beta value.

In the embodiment of the present disclosure, the first determination module is specifically configured to determine the preset threshold in a mode described below.

The preset threshold is $$\frac{r}{\beta} \text{ or } \frac{r}{c\beta}.$$

r is the predetermined code rate and the predetermined code rate is a minimum value of a code rate corresponding to a modulation mode configured in a modulation coding table, β is the predetermined beta value, and c is the adjustment factor.

In the embodiment of the present disclosure, the predetermined beta value is selected from a beta value configuration table corresponding to the uplink control information.

Referring to FIG. 4, another embodiment of the present disclosure provides a transmission apparatus (such as a base station) and includes a second determination module and a third determination module.

The second determination module is configured to determine configuration information.

The third determination module is configured to: in condition that uplink control information is configured to be transmitted in a physical uplink shared channel, and the physical uplink shared channel does not have an uplink shared channel, determine to transmit the configuration information according to an actual code rate of the uplink control information and a preset threshold.

The preset threshold is determined according to a predetermined code rate and a predetermined beta value.

Another embodiment of the present disclosure provides a transmission apparatus, the transmission apparatus includes a processor and a computer-readable storage medium configured to store instructions, and when executed by the processor, the instructions implement any one of the above-mentioned transmission methods.

Another embodiment of the present disclosure provides a computer-readable storage medium. The computer-readable storage medium stores computer programs, and when executed by a processor, the computer programs implement steps of any one of the above-mentioned transmission methods.

Figure 5:
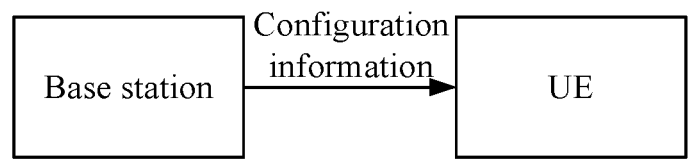
FIG. 5 is a structural diagram of a transmission system according to another embodiment of the present disclosure.

Referring to FIG. 5, another embodiment of the present disclosure provides a transmission system and the transmission system includes a base station and a UE.

The base station is used to determine and transmit configuration information.

The UE is configured to receive the configuration information; and in condition that uplink control information is configured to be transmitted in a physical uplink shared channel, and the physical uplink shared channel does not have an uplink shared channel, determine to transmit the uplink control information according to an actual code rate of the uplink control information and a preset threshold.

The preset threshold is determined according to a predetermined code rate and a predetermined beta value.

In another embodiment of the present disclosure, the base station is specifically configured as follows.

The base station is configured to determine the configuration information; and when the uplink control information is configured to be transmitted in the physical uplink shared channel, and the physical uplink shared channel does not have an uplink shared channel, determine to transmit the configuration information according to the actual code rate of the uplink control information and the preset threshold.

The preset threshold is determined according to the predetermined code rate and the predetermined beta value.

Embodiment

The UCI is configured to be transmitted in the PUSCH, and the PUSCH does not have the UL-SCH. The base station and the UE agree on each modulation mode of the UCI (including one or more of the HARQ-ACK, SR, CSI-1 and CSI-2) configured by the base station. If the actual code rate of a UCI bit is less than the threshold $T_m$, the UE will not process this configuration of the base station (the UE considers this as an erroneous configuration). That is to say, the base station is not allowed to configure the UE with a code rate for transmitting the UCI less than $T_m$. The modulation mode here includes the modulation mode in Table 3. Then, the determination of $T_m$ is carried out in one of modes described below.

The base station and the UE agree that the value of $T_m$ can be derived by a parameter r and a beta factor. Alternatively, when r and beta are fixed values, a corresponding constant value is acquired for each modulation mode. Various modes for deriving Tm are given below (one of them is sufficient) and CSI-1 is described as an example. For other UCI, similar modes are adopted (in the modes described below, if not specifically described, the UCI should refer to the CSI-1 because the CSI-1 is describe as an example).

Mode One

For BPSK modulation, Tm=rmin/betamax, where rmin is a minimum value in Table 1, and betamax is a maximum value of the CSI-1 in Table 2.

In this way, the base station and the UE agree that if the UCI is transmitted in the PUSCH and the PUSCH does not have the UL-SCH, and if the BPSK modulation is configured, the base station should configure that the actual code rate for transmitting the UCI by the UE is not less than $T_m$. That is, in BPSK, when the UE does not expect or the UE discovers that the actual code rate for transmitting the UCI is less than $T_m$, the UE considers this to be an error and does not process it. That is to say, for the BPSK, the UE only processes a case where the actual code rate for transmitting the UCI is not less than $T_m$.

For other modulation modes (the BPSK may also be included), correspondingly, Tm=Qm*rmin/betamax, and values of Qm are shown in Table 3.

Specific derivation processes are described below. The actual code rate when the UCI is transmitted is approximately calculated in the following mode (the CSI-1 is described as an example): $(O_{CSI-1}+L_{CSI-1})/(Q_m*Q'_{CSI-1})$, where $Q'_{CSI-1}$ is a number of modulation symbols of a CSI-1 bit after being encoded, $O_{CSI-1}$ is a bit number of the CSI-1, and $L_{CSI-1}$ is a CRC bit of the CSI-1 ($L_{CSI-1}$ can also be used as an option). Furthermore, an approximate value is taken for the value of $Q'_{CSI-1}$, that is, $$Q'_{CSI-1} = \min\left\{ \left\lceil \frac{(O_{CSI-1} + L_{CSI-1}) \cdot \beta^{PUSCH}_{offset}}{SE} \right\rceil, \sum_{l=0}^{N^{PUSCH}_{symb,all}-1} M^{UCI}_{sc}(l) - Q'_{ACK} \right\}$$

an equation before the curly brace is selected as the approximate value of $Q'_{CSI-1}$ according to the probability, and then the approximate value is substituted into an expression of the actual code rate of the CSI-1. Finally, the actual code rate of the CSI-1 is r/beta (beta is $\beta^{PUSCH}_{offset}$).

Mode Two

For BPSK modulation, Tm=rmin/beta, where rmin is the minimum value in Table 1. The beta is configured by the base station for the UE to transmit the UCI this time, and is selected from values of beta in Table 2. For example, the base station configures the UE with a modulation mode for transmitting the UCI in the PUSCH (the UE does not have the UL-SCH) and a corresponding beta value. At this time, the UE uses the configured beta value to calculate according to requirements.

In this way, the base station and the UE agree that if the UCI is transmitted in the PUSCH and the PUSCH does not have the UL-SCH, and if the BPSK modulation is configured, the base station should configure that the actual code rate for transmitting the UCI by the UE is not less than Tm. That is, in BPSK, when the UE does not expect or the UE discovers that the actual code rate for transmitting the UCI is less than Tm, the UE considers this to be an error and does not process it. That is to say, for the BPSK, the UE only processes a case where the actual code rate for transmitting the UCI is not less than Tm.

For other modulation modes (the BPSK may also be included), correspondingly, Tm=Qm*rmin/beta, and values of Qm are shown in Table 3.

Mode Three

For BPSK modulation, Tm=r/betamax, where r is configured by the base station for the UE to transmit the UCI this time, and is selected from values of r in Table 1. For example, the base station configures the UE with a modulation mode for transmitting the UCI in the PUSCH (the UE does not have the UL-SCH) and a corresponding value of r. At this time, the UE uses the configured r value to perform relevant calculation according to requirements, and betamax is a maximum value in Table 2.

In this way, the base station and the UE agree that if the UCI is transmitted in the PUSCH and the PUSCH does not have the UL-SCH, and if the BPSK modulation is configured, the base station should configure that the actual code rate for transmitting the UCI by the UE is not less than Tm. That is, in BPSK, when the UE does not expect or the UE discovers that the actual code rate for transmitting the UCI is less than Tm, the UE considers this to be an error and does not process it. That is to say, for the BPSK, the UE only processes a case where the actual code rate for transmitting the UCI is not less than Tm.

For other modulation modes (the BPSK may also be included), correspondingly, Tm=Qm*r/betamax, and values of Qm are shown in Table 3.

Mode Four

For the modes 1 to 3, if there is rmin and/or betamax, the value selected according to the following mode: rmin being replaced by r of an upward level (in a direction in which a code rate value decreases) of r configured by the base station, betamax being replaced by beta of a downward level (in a direction in which a value increases) of beta configured by the base station, and if there is no corresponding level upward or downward, the configured r or beta value being used.

For example, the base station configures that r is 0.35 (referring to Table 1), and when calculated, rmin uses a previous level 0.25 of 0.35; and betamax is replaced by beta of the next level downward (in the direction in which the value increases) of the beta configured by the base station. For example, the base station configures that beta is 1.625 (referring to Table 2), and when calculated, the betamin uses a next level 1.750 of 1.625. If there is no corresponding level upward or downward, the configured r or beta value is used.

For example, in mode 1, for the configured modulation mode, the corresponding Tm is Qm*rmin/betamax (the value of Qm can be seen from Table 3); and now according to the processing of mode 4, at this time, for the configured modulation mode, the corresponding Tm is Qm*rnew/betanew (the value of Qm can be seen from Table 3), where mew is the value of the upward level of the configured r; and betanew is the beta value of the downward level of the configured beta. If there is no corresponding level upward or downward, the configured r or beta value is used.

For example, in mode 2, for the configured modulation mode, the corresponding Tm is Qm*rmin/beta (the value of Qm can be seen from Table 3); and now according to the processing of mode 4, at this time, for the configured modulation mode, the corresponding Tm is Qm*rnew/beta (the value of Qm can be seen from Table 3), where mew is the value of the upward level of the configured r. If there is no corresponding level upward or downward, the configured r or beta value is used.

For example, in mode 3, for the configured modulation mode, the corresponding Tm is Qm*r/betamax (the value of Qm can be seen from Table 3); and now according to the processing of mode 4, at this time, for the configured modulation mode, the corresponding Tm is Qm*r/betanew (the value of Qm can be seen from Table 3), where betanew is the beta value of the downward level of the configured beta. If there is no corresponding level upward or downward, the configured r or beta value is used.

In modes 1 to 4, optionally, the code rate may be calculated specifically according to $(O_{CSI-1}+L_{CSI-1})/(Q_m*Q'_{CSI-1})$. At this time, under the calculated code rate, the number of PRBs of actually transmitted UCI is an integer (that is, a part of the PRB is not included in a frequency domain, or a number of PRBs in the frequency domain is rounded up to an integer).

When the transmission of UCI in the PUSCH is performed, if a slot has a plurality of PUSCHs (the PUSCH may not to have the UL-SCH), the base station and the UE agree to select an n-th (in a time direction) PUSCH channel in the slot for UCI transmission (n is preferably 1). Alternatively, the base station and the UE agree to select a PUSCH with most time-frequency resources of the PUSCH in the slot for UCI transmission (if there are multiple PUSCHs with the most time-frequency resources, the first PUSCH with the most time-frequency resources is selected). That is to say, the user equipment (UE) is configured to transmit the uplink control information (UCI) in the physical uplink shared channel (PUSCH), and when a slot where the PUSCH is located has a plurality of PUSCHs of the UE, the nth (n is preferably 1) PUSCH channel in the slot is selected for UCI transmission. Alternatively, the PUSCH with the most time-frequency resources in the plurality of PUSCHs in the slot is selected for UCI transmission. Alternatively, the base station informs that (for example, the UE is informed directly through signaling in Downlink Control Information (DCI) or implicitly through other parameters) in which PUSCH the UE performs UCI transmission through signaling. For an implied notification mode, the base station can deduce and determine which PUSCH used by the UE in the slot is by an index of a control channel element (CCE) where the DCI is located. For example, the first index value of the CCE complements the number of PUSCHs, and a remainder indicates which PUSCH in the slot is used to transmit the UCI. A remainder of 0 indicates the first PUSCH, a remainder of 1 indicates the second PUSCH, . . . , and so on.

The adoption of the mode in which the PUSCH with the most time-frequency resources in the plurality of PUSCHs in the slot is selected for the UCI transmission facilitates minimizing of influence on the performance of the PUSCH, and thus, perforated PUSCH data is smaller than original whole PUSCH data. By adopting the notification mode, it is advantageous to avoid the UCI transmission in some PUSCHs requiring a high-reliability service (such as an ultra reliable & low latency communication (URLLC) service), such that the reliability of the URLLC will not be affected. Currently, the UE does not know whether a scheduled service is the URLLC, but the base station knows.

It will be understood by those skilled in the art that functional modules/units in all or part of the steps of the method, the system and the apparatus disclosed above may be implemented as software, firmware, hardware and appropriate combinations thereof. In the hardware implementation, the division of the functional modules/units mentioned in the above description may not correspond to the division of physical components. For example, one physical component may have several functions, or one function or step may be performed jointly by several physical components. Some or all components may be implemented as software executed by processors such as digital signal processors or microcontrollers, hardware, or integrated circuits such as application specific integrated circuits. Such software may be distributed on a computer-readable medium, which may include a computer storage medium (or a non-transitory medium) and a communication medium (or a transitory medium). As is known to those of ordinary skill in the art, the term, computer storage medium, includes volatile and nonvolatile, removable and non-removable media implemented in any method or technology for storing information (such as computer-readable instructions, data structures, program modules or other data). The computer storage medium includes, but is not limited to, a random access memory (RAM), a read-only memory (ROM), an electrically erasable programmable read-only memory (EEPROM), a flash memory or other memory technologies, a compact disc-read only memory (CD-ROM), a digital versatile disc (DVD) or other optical disc storage, a magnetic cassette, a magnetic tape, a magnetic disk storage or other magnetic storage apparatuses, or any other media used for storing desired information and accessed by a computer. In addition, as is known to those of ordinary skill in the art, the communication medium generally includes computer-readable instructions, data structures, program modules or other data in modulated data signals such as carriers or other transmission mechanisms, and may include any information delivery medium.

Although the implementation modes disclosed by the embodiments of the present disclosure are as described above, the content thereof is merely implementation modes for facilitating the understanding of the embodiments of the present disclosure and is not intended to limit the embodiments of the present disclosure. Any person skilled in the art to which the embodiments of the present disclosure pertains may make any modifications and changes in the form of implementation and details without departing from the spirit and scope disclosed by the embodiments of the present disclosure, but the patent protection scope of the embodiments of the present disclosure is still subject to the scope defined by the appended claims.

INDUSTRIAL APPLICABILITY

The present disclosure is applicable to the field of wireless communications. By limiting the lower limit of the actual code rate, excessively being lower than the corresponding optimal code rate of the modulation mode can be avoided, thereby improving the transmission efficiency.

What is claimed is:
1. A method for transmitting uplink control information in a physical uplink shared channel, comprising:
in response to channel state information part 2 (CSI-2) being configured to be transmitted in the physical uplink shared channel (PUSCH) and the physical uplink shared channel not having an uplink shared channel (UL-SCH), determining to transmit the CSI-2 according to an actual code rate of the CSI-2 and a preset threshold, wherein the PUSCH not having the UL-SCH refers to the PUSCH not carrying UL-SCH data;
wherein the actual code rate of the CSI-2 is determined according to a following formula:

$$\frac{O_{UCI}+L_{UCI}}{Q_m Q'_{UCI}},$$

wherein $Q_{UCI}$ is a bit number of the uplink control information (UCI), $L_{UCI}$ a bit number of a cyclic redundancy check (CRC) of the UCI, $Q_m$ is a modulation order corresponding to a modulation mode of the UCI, and $Q'_{UCI}$ is a number of modulation symbols of UCI after being bit-encoded, and the UCI comprises the CSI-2;
wherein the preset threshold is determined according to a predetermined code rate and a predetermined beta value, wherein the predetermined code rate refers to a code rate configured by a base station for a current CSI-2 transmission and is selected from a code rate table of the PUSCH, and the predetermined beta value is selected from a beta value configuration table corresponding to the CSI-2; and wherein the transmission method further comprises: in response to the uplink control information being configured to be transmitted in the PUSCH in one slot and the one slot having a plurality of PUSCHs, determining one PUSCH among the plurality of PUSCHs to transmit the uplink control information according to one of following rules:

selecting first of the plurality of PUSCHs in the one slot along a time direction;

selecting a PUSCH with most time-frequency domain resources among the plurality of PUSCHs in the one slot, and in response to an existence of multiple PUSCHs with the most time-frequency domain resources, selecting first of the multiple PUSCHs with the most time-frequency domain resources along a time direction;

receiving a notification, sent by the base station through a signaling, for informing which PUSCH among the plurality of PUSCHs is used for transmitting the uplink control information; or receiving an implied notification, sent by the base station and determined through an index of a control channel element where downlink control information is located, for informing which PUSCH among the plurality of PUSCHs is used for transmitting the uplink control information.

2. The transmission method of claim 1, wherein the actual code rate of the uplink control information is acquired according to the bit number of the uplink control information and the modulation mode of the uplink control information, and the actual code rate of the uplink control information is acquired further according to at least one of:

a type of the uplink control information, a configured code rate, resources of the PUSCH, or a configured beta value.

3. The transmission method of claim 1, wherein the determining to transmit the uplink control information according to the actual code rate of the uplink control information and the preset threshold comprises:

in response to the actual code rate being greater than or equal to the preset threshold, transmitting the uplink control information in the PUSCH.

4. The transmission method of claim 1, wherein determining the preset threshold according to the predetermined code rate and the predetermined beta value comprises:

the preset threshold being $$Q_m \frac{r}{\beta} \text{ or } Q_m \frac{r}{c\beta};$$

wherein r is the predetermined code rate, β is the predetermined beta value, c is an adjustment factor, and $Q_m$ is the modulation order corresponding to the modulation mode.

5. The transmission method of claim 4, wherein the predetermined code rate is a minimum value of a code rate corresponding to a physical uplink control channel, and the predetermined beta value is a maximum value of a beta value corresponding to the uplink control information; or the predetermined code rate is the minimum value of the code rate corresponding to the physical uplink control channel, and the predetermined beta value is the configured beta value; or the predetermined code rate is the configured code rate, and the predetermined beta value is the maximum value of the beta value corresponding to the uplink control information.

6. The transmission method of claim 4, comprising one of:

in response to the configured code rate having a code rate of a previous level and the configured beta value having a beta value of a next level, the predetermined code rate is the code rate of the previous level of the configured code rate, and the predetermined beta value is the beta value of the next level of the configured beta value;

in response to the configured code rate having the code rate of the previous level and the configured beta value having the beta value of the next level, the predetermined code rate is the code rate of the previous level of the configured code rate, and the predetermined beta value is the configured beta value;

in response to the configured code rate not having the code rate of the previous level and the configured beta value having the beta value of the next level, the predetermined code rate is the configured code rate, and the predetermined beta value is the beta value of the next level of the configured beta value; or in response to the configured code rate not having the code rate of the previous level and the configured beta value not having the beta value of the next level, the predetermined code rate is the configured code rate, and the predetermined beta value is the configured beta value.

7. The transmission method of claim 4, comprising one of:

in response to the configured code rate having a code rate of a previous level, the predetermined code rate is the code rate of the previous level of the configured code rate, and the predetermined beta value is the configured beta value; or in response to the configured code rate not having the code rate of the previous level, the predetermined code rate is the configured code rate, and the predetermined beta value is the configured beta value.

8. The transmission method of claim 4, comprising one of:

in response to the configured beta value having a beta value of a next level, the predetermined code rate is the configured code rate, and the predetermined beta value is the beta value of the next level of the configured beta value; or in response to the configured beta value not having the beta value of the next level, the predetermined code rate is the configured code rate, and the predetermined beta value is the configured beta value.

9. The transmission method of claim 1, wherein determining the preset threshold according to the predetermined code rate and the predetermined beta value comprises:

the preset threshold being $$\frac{r}{\beta} \text{ or } \frac{r}{c\beta};$$

wherein r is the predetermined code rate and the predetermined code rate is a minimum value of a code rate corresponding to a modulation mode configured in a modulation coding table, β is the predetermined beta value, and c is an adjustment factor.

10. An apparatus for transmitting uplink control information in a physical uplink shared channel, comprising a processor and a computer-readable storage medium configured to store instructions, wherein when executed by the processor, the instructions implement the transmission method of claim 1.

11. A non-transitory computer-readable storage medium, which is configured to store computer programs for implementing steps of the transmission method of claim 1 when the computer programs are executed by a processor.

12. A method for transmitting uplink control information in a physical uplink shared channel, comprising:
  determining configuration information; and
  in response to channel state information part 2 (CSI-2) being configured to be transmitted in the physical uplink shared channel (PUSCH) and the PUSCH not having an uplink shared channel, determining to transmit the configuration information according to an actual code rate of the CSI-2 and a preset threshold, wherein the PUSCH not having the UL-SCH refers to the PUSCH not carrying UL-SCH data;
  wherein the actual code rate of the CSI-2 is determined according to a following formula:

$$\frac{O_{UCI} + L_{UCI}}{Q_m Q'_{UCI}},$$

wherein $Q_{UCI}$ is a bit number of the uplink control information (UCI), $L_{UCI}$ is a bit number of a cyclic redundancy check (CRC) of the UCI, $Q_m$ is a modulation order corresponding to a modulation mode of the UCI, and $Q'_{UCI}$ is a number of modulation symbols of UCI after being bit-encoded, and the UCI comprises the CSI-2;
    wherein the preset threshold is determined according to a predetermined code rate and a predetermined beta value, wherein the predetermined code rate refers to a code rate configured by a base station for a current CSI-2 transmission and is selected from a code rate table of the PUSCH, and the predetermined beta value is selected from a beta value configuration table corresponding to the CSI-2; and
  wherein the transmission method further comprises: in response to the uplink control information being configured to be transmitted in the PUSCH in one slot and the one slot having a plurality of PUSCHs, determining one PUSCH among the plurality of PUSCHs for the uplink control information according to one of following rules:
  determining first of the plurality of PUSCHs in the one slot along a time direction;
  determining a PUSCH with most time-frequency domain resources among the plurality of PUSCHs in the one slot, and in response to an existence of multiple PUSCHs with the most time-frequency domain resources, determining first of the multiple PUSCHs with the most time-frequency domain resources along a time direction;
  sending a notification, by the base station through a signaling, for informing which PUSCH where the uplink control information is transmitted among the plurality of PUSCHs; or
  sending an implied notification, by the base station through determining an index of a control channel element where downlink control information is located, for informing which PUSCH where the uplink control information is transmitted among the plurality of PUSCHs.

13. An apparatus for transmitting uplink control information in a physical uplink shared channel, comprising a processor and a computer-readable storage medium configured to store instructions, wherein when executed by the processor, the instructions implement the transmission method of claim 12.

14. A non-transitory computer-readable storage medium, which is configured to store computer programs for implementing steps of the transmission method of claim 12 when the computer programs are executed by a processor.

* * * * *